(12) United States Patent
Shibata et al.

(10) Patent No.: US 7,617,402 B2
(45) Date of Patent: Nov. 10, 2009

(54) COPYRIGHT PROTECTION SYSTEM, ENCRYPTION DEVICE, DECRYPTION DEVICE AND RECORDING MEDIUM

(75) Inventors: Osamu Shibata, Moriguchi (JP); Tsutomu Sekibe, Hirakata (JP)

(73) Assignee: Panasonic Corporation, Osaka (JP)

( * ) Notice: Subject to any disclaimer, the term of this patent is extended or adjusted under 35 U.S.C. 154(b) by 1353 days.

(21) Appl. No.: 09/828,559

(22) Filed: Apr. 6, 2001

(65) Prior Publication Data

US 2004/0076294 A1    Apr. 22, 2004

(30) Foreign Application Priority Data

Apr. 6, 2000    (JP)    ............... 2000-105525

(51) Int. Cl.
  G06F 11/30    (2006.01)
  G06F 12/14    (2006.01)
  H04L 9/32    (2006.01)

(52) U.S. Cl. .................................... 713/193
(58) Field of Classification Search ................ 713/153, 713/193

See application file for complete search history.

(56) References Cited

U.S. PATENT DOCUMENTS 4,071,693 A * 1/1978 Frutiger ...................... 380/262

| 6,550,011 B1 * | 4/2003 | Sims, III ..................... 713/193 |
| 6,728,379 B1 * | 4/2004 | Ishibashi et al. ............ 380/278 |
| 6,792,539 B1 * | 9/2004 | Oishi et al. ................. 713/194 |
| 6,832,319 B1 * | 12/2004 | Bell et al. .................... 713/193 |

FOREIGN PATENT DOCUMENTS

| EP | 0 800 312 | 8/1997 |
| EP | 0 878 796 | 11/1998 |
| EP | 0 994 475 | 4/2000 |
| JP | 07-131449 | 5/1992 |

* cited by examiner

*Primary Examiner*—Kambiz Zand
*Assistant Examiner*—Farid Homayounmehr
(74) *Attorney, Agent, or Firm*—Snell & Wilmer L.L.P.

(57) ABSTRACT

A copyright protection system comprises an encryption device and a decryption device. Cryptographic communication is performed between the encryption device and the decryption device using a contents key. The encryption device includes a contents storage section for storing contents, a first contents key generation section for generating the contents key based on a second decryption limitation obtained by updating a first decryption limitation, and a first encryption section for encrypting the contents using the contents key and outputting the encrypted contents. The decryption device includes a second contents key generation section for generating the contents key from the second decryption limitation, and a first decryption section for decrypting the encrypted contents using the contents key generated by the second contents key generation section.

42 Claims, 9 Drawing Sheets

COPYRIGHT PROTECTION SYSTEM, ENCRYPTION DEVICE, DECRYPTION DEVICE AND RECORDING MEDIUM

BACKGROUND OF THE INVENTION

1. Field of the Invention

The present invention relates to a communication system performing cryptographic communication in which digital contents, such as music, images, videos, and games, having a decryption limitation are transferred using a common key which is shared by devices so that the decryption of the digital contents is forbidden when the updating of the decryption limitation is unauthorized. More particularly, the present invention relates to a copyright protection system, an encryption device, a decryption device, and a recording medium for protecting copyrights by associating update information on the decryption limitation with the common key.

2. Description of the Related Art

Recently, the development of digital information compression technologies and the explosive pervasion of communication infrastructures have realized that contents, such as music, images, videos, and games, are distributed in the form of digital information via communication lines to homes.

The digital information distributed via communication lines is in the form of data which is not stored in any medium. Therefore, the flexibility of distribution service forms is dramatically increased. Distribution services can not only provide digital contents but also limit the use of the contents (e.g., the limited number of uses and the limited period of use). A wide variety of distribution service forms are contemplated.

The establishment of distribution systems, in which the copyrights of digital contents and the profits of distributors are protected, requires solving how to prevent unauthorized actions, such as fraud possession by communication intercept, eavesdropping, pretending, or the like, and illegal duplications and falsifications of received data stored in a recording medium. Such a solution would be provided by copyright protection technologies, such as an encryption/authentication technique performing the identification of authentic systems, data scramble, and the like.

There are a variety of conventional copyright protection technologies. A typical technology is a challenge-response type mutual authentication system in which random numbers and response values are exchanged between a data encryption device and a data decryption device so that both devices are mutually authenticated, and data is transferred when the authentication is established.

The term "decryption limitation" as used herein refers to information on whether contents transferred from an encryption device to a decryption device are allowed to be used (e.g., reproduce to make a sound). For example, when contents are associated with the number of times the contents can be reproduced, such a number of times is a decryption limitation.

The term "updating of a decryption limitation" as used herein refers to a rule which is used in updating a decryption limitation. For example, for contents associated with the number of times the contents can be reproduced (e.g., N times), such a number of times is a decryption limitation transferred from an encryption device to a decryption device, and the updating of the decryption limitation means that the number of times is reduced by one.

The term "update information on a decryption limitation" as used herein refers to a decryption limitation which is updated. For example, for contents associated with the number of times the contents can be reproduced (e.g., N times), the number of times which is a decryption limitation transferred from an encryption device to a decryption device, is updated so that the update information on the decryption limitation is rewritten to "N−1 times".

A typical cryptographic communication system in which digital contents having a decryption limitation are transferred using the above-described mutual authentication technique, will be described. An encryption device and a decryption device are mutually authenticated. Only when the authentication is established, the decryption limitation is encrypted and then transferred from the encryption device to the decryption device. The decryption device interprets the decryption limitation to determine whether the digital contents can be decrypted, and updates the decryption limitation. The update information on the updated decryption limitation is encrypted and transferred to the encryption device. Thereafter, the contents are encrypted and loaded into the decryption device which in turn decrypts the loaded contents.

A decryption limitation should be correctly updated. In other words, update information on a decryption limitation decrypted by a decryption device should be received by an authenticated encryption device. If a decryption limitation is not correctly updated, i.e., update information on a decryption limitation decrypted by a decryption device is received by a false encryption device pretending to be an authenticated encryption device, the decryption limitation is not updated by the authenticated encryption device and contents loaded from the authenticated encryption device are decrypted by the decryption device in an unauthorized manner. Therefore, a system is required in which, when update information on a decryption limitation decrypted by a decryption device is received by a false encryption device pretending to be an authenticated encryption device, the decryption device is forbidden to decrypt contents loaded from the authenticated encryption device.

In the above-described mutual authentication technique, a determination is made only as to whether communicating devices are authenticated. Whether a decryption limitation is currently updated is not determined. Therefore, an unauthorized action cannot be prevented. If update information on a decryption limitation decrypted by a decryption device is received by a false encryption device pretending to be an authenticated encryption device, the decryption limitation is not updated by the authenticated encryption device, and nevertheless contents loaded from the authenticated encryption device cannot be decrypted by the decryption device in an unauthorized manner.

SUMMARY OF THE INVENTION

According to one aspect of the present invention, a copyright protection system comprises an encryption device and a decryption device, wherein cryptographic communication is performed between the encryption device and the decryption device using a contents key. The encryption device includes a contents storage section for storing contents, a first contents key generation section for generating the contents key based on a second decryption limitation obtained by updating a first decryption limitation, and a first encryption section for encrypting the contents using the contents key and outputting the encrypted contents. The decryption device includes a second contents key generation section for generating the contents key from the second decryption limitation, and a first decryption section for decrypting the encrypted contents using the contents key generated by the second contents key generation section.

In one aspect of this invention, the decryption device further includes a decryption limitation updating section for updating the first decryption limitation to the second decryption limitation in accordance with a decryption limitation updating rule, and a second encryption section for encrypting the second decryption limitation using a time-varying key, and outputting the first encrypted decryption limitation. The encryption device further includes a second decryption section for decrypting the first encrypted decryption limitation transferred from the second encryption section using the time-varying key to generate the second decryption limitation. The first contents key generation section generates the contents key based on the second decryption limitation generated by the second decryption section.

In one aspect of this invention, the encryption device further includes a first common key storage section for storing a common key, a decryption limitation storage section for storing the first decryption limitation, a first random number generation section for generating a first random number, a first mutual authentication section for performing mutual authentication in association with the decryption device using the first random number, and a second random number transferred from the decryption device, a first time-varying key generation section for generating the time-varying key using the first random number and the second random number in response to the authentication by the first mutual authentication section, and a third encryption section for encrypting the first decryption limitation using the time-varying key and outputting the second encrypted decryption limitation. The decryption device further includes a second common key storage section for storing the common key, a second random number generation section for generating the second random number, a second mutual authentication section for performing mutual authentication in association with the encryption device using the second random number and the first random number, a second time-varying key generation section for generating the time-varying key using the second random number and the first random number in response to the authentication by the second mutual authentication section, and a third decryption section for decrypting the second encrypted decryption limitation using the time-varying key.

In one aspect of this invention, the decryption device further includes a first decryption limitation updating section for updating the first decryption limitation to the second decryption limitation in accordance with a decryption limitation updating rule, and a second contents key generation section for generating the contents key based on the second decryption limitation updated by the first decryption limitation updating section. The encryption device further includes a second decryption limitation updating section for updating the first decryption limitation to the second decryption limitation in accordance with the decryption limitation updating rule in response to the updating of the first decryption limitation by the first decryption limitation updating section. The first contents key generation section generates the contents key based on the second decryption limitation updated by the first decryption limitation updating section.

In one aspect of this invention, the encryption device further includes a first common key storage section for storing a common key, a decryption limitation storage section for storing the first decryption limitation, a first random number generation section for generating a first random number, a first mutual authentication section for performing mutual authentication in association with the decryption device using the first random number, and a second random number transferred from the decryption device, a first time-varying key generation section for generating a time-varying key using the first random number and the second random number in response to the authentication by the first mutual authentication section, and a second encryption section for encrypting the first decryption limitation using the time-varying key and outputting an encrypted decryption limitation. The decryption device further includes a second common key storage section for storing the common key, a second random number generation section for generating the second random number, a second mutual authentication section for performing mutual authentication in association with the encryption device using the second random number and the first random number, a second time-varying key generation section for generating the time-varying key using the second random number and the first random number in response to the authentication by the second mutual authentication section, and a second decryption section for decrypting the encrypted decryption limitation using the time-varying key.

In one aspect of this invention, the second decryption limitation updating section updates the first decryption limitation to the second decryption limitation in advance. The first contents key generation section generates the contents key from the second decryption limitation. The second decryption limitation updating section stores the second decryption limitation in the decryption limitation storage section in response to the start of processing by the first encryption section.

In one aspect of this invention, the first and second time-varying key generation sections generate the time-varying key based on the first and second random numbers and the common key.

In one aspect of this invention, the first and second contents key generation sections generate the contents key based on the second decryption limitation and the time-varying key.

In one aspect of this invention, the encryption device and the decryption device further include respective first and second data sequence key generation sections for generating a data sequence key based on a data sequence input to or output from the encryption device and the decryption device. The first and second time-varying key generation sections generate the time-varying key based on the first and second random numbers and the respective data sequence key.

In one aspect of this invention, the encryption device and the decryption device further include respective first and second data sequence key generation sections for generating a data sequence key based on a data sequence-input to or output from the encryption device and the decryption device. The first and second time-varying key generation sections generate the time-varying key based on the first and second random numbers, the common key, and the respective data sequence key.

In one aspect of this invention, the encryption device and the decryption device further include respective first and second data sequence key generation sections for generating a data sequence key based on a data sequence input to or output from the encryption device and the decryption device. The first and second contents key generation sections generate the contents key based on the second decryption limitation and the respective data sequence key.

In one aspect of this invention, the encryption device and the decryption device further include respective first and second data sequence key generation sections for generating a data sequence key based on a data sequence input to or output from the encryption device and the decryption device. The first and second contents key generation section generate the contents key based on the second decryption limitation, the time-varying key, and the respective data sequence key.

In one aspect of this invention, the first and second mutual authentication sections mutually authenticate the decryption device and the encryption device, respectively, by communication in accordance with a challenge-response type authentication protocol.

According to another aspect of the present invention, an encryption device for performing cryptographic communication in association with a decryption device using a contents key, comprises a contents storage section for storing contents, a contents key generation section for generating the contents key based on a second decryption limitation obtained by updating a first decryption limitation, and a first encryption section for encrypting the contents using the contents key and outputting the encrypted contents.

In one aspect of this invention, the encryption device further includes a decryption section for decrypting the first encrypted decryption limitation transferred from the decryption device using the time-varying key to generate the second decryption limitation, and the contents key generation section generates the contents key based on the second decryption limitation generated by the decryption device.

In one aspect of this invention, the encryption device further includes a common key storage section for storing a common key, a decryption limitation storage section for storing the first decryption limitation, a first random number generation section for generating a first random number, a mutual authentication section for performing mutual authentication in association with the decryption device using the first random number, and a second random number transferred from the decryption device, a time-varying key generation section for generating the time-varying key using the first random number and the second random number in response to the authentication by the mutual authentication section, and a second encryption section for encrypting the first decryption limitation using the time-varying key and outputting the second encrypted decryption limitation.

In one aspect of this invention, the encryption device further includes a decryption limitation updating section for updating the first decryption limitation to the second decryption limitation in accordance with a decryption limitation updating rule in response to the updating of a decryption limitation by the decryption device. The contents key generation section generates the contents key based on the second decryption limitation obtained by the decryption limitation updating section.

In one aspect of this invention, the encryption device further includes a common key storage section for storing a common key, a decryption limitation storage section for storing the first decryption limitation, a first random number generation section for generating a first random number, a mutual authentication section for performing mutual authentication in association with the decryption device using the first random number, and a second random number transferred from the decryption device, a time-varying key generation section for generating a time-varying key using the first random number and the second random number in response to the authentication by the mutual authentication section, and a second encryption section for encrypting the first decryption limitation using the time-varying key and outputting an encrypted decryption limitation.

In one aspect of this invention, the decryption limitation updating section updates the first decryption limitation to the second decryption limitation in advance. The decryption limitation updating section outputs the second decryption limitation to the contents key generation section. The contents key generation section generates the contents key from the second decryption limitation. The decryption limitation updating section stores the second decryption limitation in the decryption limitation storage section in response to the start of processing by the first encryption section.

In one aspect of this invention, the time-varying key generation section generates the time-varying key based on the first and second random numbers and the common key.

In one aspect of this invention, the contents key generation section generates the contents key based on the second decryption limitation and the time-varying key.

In one aspect of this invention, the encryption device further includes a data sequence key generation section for generating a data sequence key based on a data sequence input to or output from the encryption device, the time-varying key generation section generates the time-varying key based on the first and second random numbers and the data sequence key.

In one aspect of this invention, the encryption device further includes a data sequence key generation section for generating a data sequence key based on a data sequence input to or output from the encryption device. The time-varying key generation section generates the time-varying key based on the first and second random numbers, the common key, and the data sequence key.

In one aspect of this invention, the encryption device further includes a data sequence key generation section for generating a data sequence key based on a data sequence input to or output from the encryption device. The contents key generation section generates the contents key based on the second decryption limitation and the data sequence key.

In one aspect of this invention, the encryption device further includes a data sequence key generation section for generating a data sequence key based on a data sequence input to or output from the encryption device. The contents key generation section generates the contents key based on the second decryption limitation, the time-varying key, and the data sequence key.

According to another aspect of the present invention, a decryption device for performing cryptographic communication in association with an encryption device using a contents key, comprises a contents key generation section for generating the contents key from a second decryption limitation, and a first decryption section for decrypting encrypted contents using the contents key generated by the contents key generation section.

In one aspect of this invention, the decryption device further includes a decryption limitation updating section for updating a first decryption limitation to the second decryption limitation in accordance with a decryption limitation updating rule, and an encryption section for encrypting the second decryption limitation using a time-varying key, and outputting the first encrypted decryption limitation.

In one aspect of this invention, the decryption device further includes a common key storage section for storing the common key, a random number generation section for generating the second random number, a mutual authentication section for performing mutual authentication in association with the encryption device using the second random number and a first random number, a time-varying key generation section for generating the time-varying key using the second random number and the first random number in response to the authentication by the mutual authentication section, and a second decryption section for decrypting a first encrypted decryption limitation using the time-varying key.

In one aspect of this invention, the decryption device further includes a decryption limitation updating section for updating the first decryption limitation to a second decryption limitation in accordance with a decryption limitation updating rule. A contents key generation section for generating the contents key based on the second decryption limitation updated by the decryption limitation updating section.

In one aspect of this invention, the decryption device further includes a second common key storage section for storing the common key, a second random number generation section for generating the second random number, a mutual authentication section for performing mutual authentication in association with the encryption device using the second random number and a first random number, a time-varying key generation section for generating the time-varying key using the second random number and the first random number in response to the authentication by the mutual authentication section, and a second decryption section for decrypting encrypted decryption limitation using the time-varying key.

In one aspect of this invention, the time-varying key generation section generates the time-varying key based on the first and second random numbers and the common key.

In one aspect of this invention, the contents key generation section generates the contents key based on the second decryption limitation and the time-varying key.

In one aspect of this invention, the decryption device further includes a data sequence key generation section for generating a data sequence key based on a data sequence input to or output from the decryption device. The time-varying key generation section generates the time-varying key based on the first and second random numbers and the data sequence key.

In one aspect of this invention, the decryption device further includes a data sequence key generation section for generating a data sequence key based on a data sequence input to or output from the decryption device. The time-varying key generation section generates the time-varying key based on the first and second random numbers, the common key, and the data sequence key.

In one aspect of this invention, the decryption device further includes a data sequence key generation section for generating a data sequence key based on a data sequence input to or output from the decryption device. The contents key generation section generates the contents key based on the second decryption limitation and the data sequence key.

In one aspect of this invention, the decryption device further includes a data sequence key generation section for generating a data sequence key based on a data sequence input to or output from the decryption device. The contents key generation section generates the contents key based on the second decryption limitation, the time-varying key, and the data sequence key.

According to another aspect of the present invention, there is provided a recording medium storing a program for use in causing a computer to perform cryptographic communication with an encryption device using a contents key. The program causes the computer to function as a contents key generation section for generating the contents key from a second decryption limitation, and a first decryption section for decrypting encrypted contents using the contents key generated by the contents key generation section.

In one aspect of this invention, the program causes the computer to further function as a decryption limitation updating section for updating a first decryption limitation to the second decryption limitation in accordance with a decryption limitation updating rule, and an encryption section for encrypting the second decryption limitation using a time-varying key, and outputting a first encrypted decryption limitation.

In one aspect of this invention, the program causes the computer to further function as a common key storage section for storing the common key, a random number generation section for generating a second random number, a mutual authentication section for performing mutual authentication in association with the encryption device using the second random number and a first random number, a time-varying key generation section for generating the time-varying key using the second random number and the first random number in response to the authentication by the mutual authentication section, and a second decryption section for decrypting a first encrypted decryption limitation using the time-varying key.

In one aspect of this invention, the program causes the computer to further function as a decryption limitation updating section for updating a first decryption limitation to the second decryption limitation in accordance with a decryption limitation updating rule, and a contents key generation section for generating the contents key based on the second decryption limitation obtained by the decryption limitation updating section.

In one aspect of this invention, the program causes the computer to further function as a second common key storage section for storing the common key, a second random number generation section for generating the second random number, a mutual authentication section for performing mutual authentication in association with the encryption device using the second random number and a first random number, a time-varying key generation section for generating a time-varying key using the second random number and the first random number in response to the authentication by the mutual authentication section, and a second decryption section for decrypting encrypted decryption limitation using the time-varying key.

In one aspect of this invention, the time-varying key generation section generates the time-varying key based on the first and second random numbers and the common key.

In one aspect of this invention, the contents key generation section generates the contents key based on the second decryption limitation and the time-varying key.

In one aspect of this invention, the program causes the computer to further function as a data sequence key generation section for generating a data sequence key based on a data sequence input to or output from a decryption device. The time-varying key generation section generates the time-varying key based on the first and second random numbers and the data sequence key.

In one aspect of this invention, the program causes the computer to further function as a sequence key generation section for generating a data sequence key based on a data sequence input to or output from a decryption device. The time-varying key generation section generates the time-varying key based on the first and second random numbers, the common key, and the data sequence key.

In one aspect of this invention, the program causes the computer to further function as a data sequence key generation section for generating a data sequence key based on a data sequence input to or output from a decryption device. The contents key generation section generates the contents key based on the second decryption limitation and the data sequence key.

In one aspect of this invention, the program causes the computer to further function as a data sequence key generation section for generating a data sequence key based on a data sequence input to or output from a decryption device. The contents key generation section generates the contents key based on the second decryption limitation, the time-varying key, and the data sequence key.

Thus, the invention described herein makes possible the advantages of (1) providing a copyright protection system, an encryption device, a decryption device, and a recording medium, in which a decryption limitation is reliably updated and unauthorized decryption of digital contents is prevented, and (2) providing a copyright protection system, an encryption device, a decryption device, and a recording medium, in which, when update information on a decryption limitation updated by a decryption device is received by a false encryption device pretending to be an authenticated encryption device (instead of the authenticated encryption device), contents loaded from the authenticated encryption device cannot be decrypted by the decryption device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. In the present invention, a decryption limitation is used to generate a common key which is used to encrypt digital contents.

EXAMPLE 1

Figure 1:
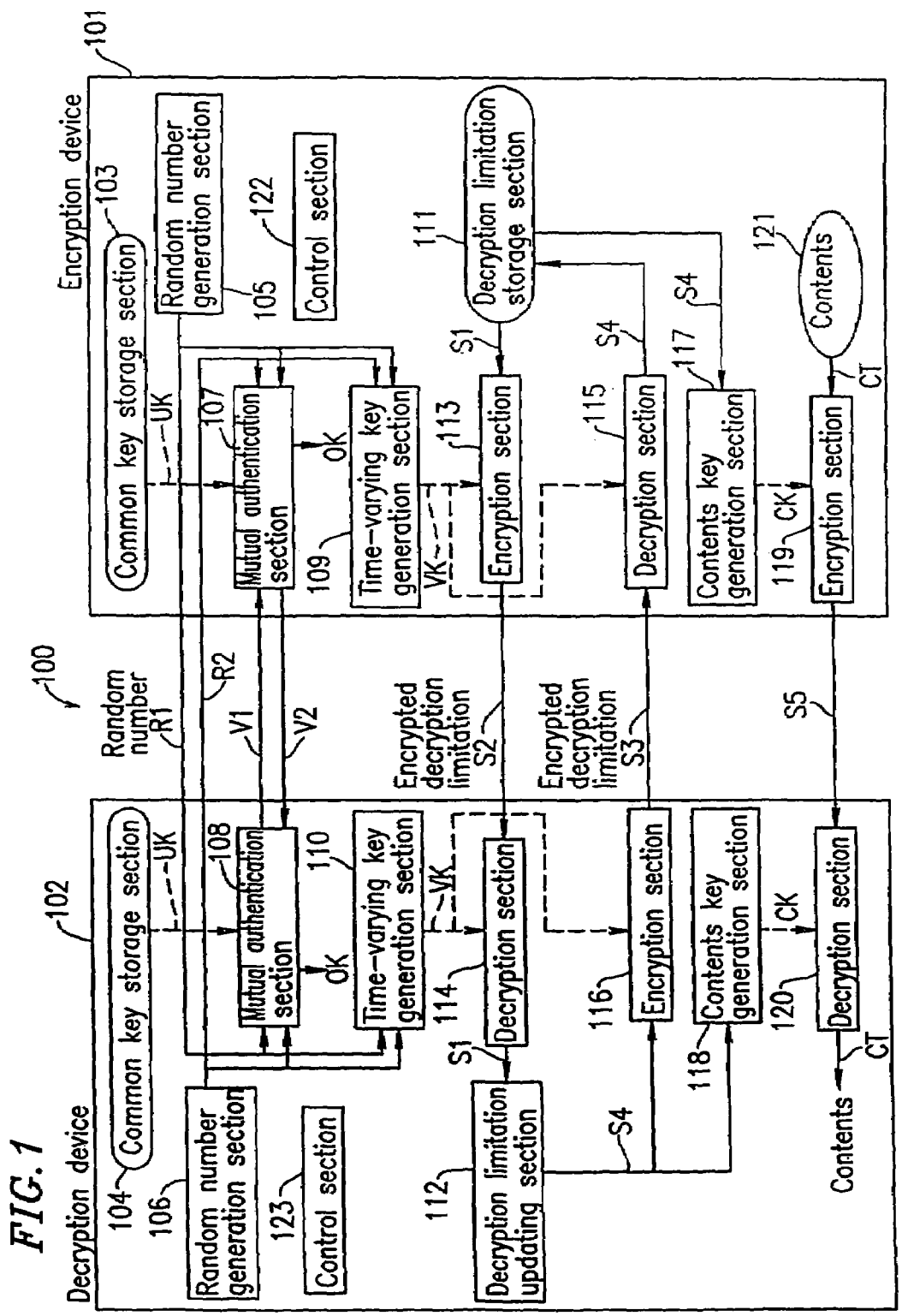
FIG. 1 is a diagram showing a configuration of a system according to Example 1 of the present invention.

FIG. 1 is a diagram showing a configuration of a system according to Example 1 of the present invention, in which cryptographic communication is performed between an encryption device 101 and a decryption device 102.

The encryption device 101 includes: a common key storage section 103 for storing a common key UK; a decryption limitation storage section 111 for storing a decryption limitation; a contents storage section 121 for storing contents CT; a random number generation section 105 for generating a random number R1; a mutual authentication section 107 for performing mutual authentication with the decryption device 102 using the random number R1, a random number R2 transferred from the decryption device 102, and the common key UK; a time-varying key generation section 109 for generating a time-varying key VK every time the mutual authentication using the random numbers R1 and R2 is performed in the mutual authentication section 107; an encryption section 113 for encrypting the decryption limitation S1 using the time-varying key VK, and outputting an encrypted decryption limitation S2; a decryption section 115 for decrypting an encrypted decryption limitation S3 transferred from an encryption section 116 of the decryption device 102, using the time-varying key VK, to a decryption limitation S4, and writing the decryption limitation S4 to the decryption limitation storage section 111; a contents key generation section 117 for generating a contents key CK from the decryption limitation S4; and an encryption section 119 for encrypting the contents CT using the contents key CK, and outputting encrypted contents S5.

The decryption device 102 includes: a common key storage section 104 for storing the common key UK; a random number generation section 106 for generating the random number R2; a mutual authentication section 108 for performing mutual authentication with the encryption device 101 using the random numbers R1 and R2 and the common key UK; a time-varying key generation section 110 for generating the time-varying key VK in response to the mutual authentication in the mutual authentication section 108; a decryption section 114 for decrypting the encrypted decryption limitation S2 using the time-varying key VK; a decryption limitation updating section 112 for updating the decryption limitation S4 based on a decryption limitation updating rule using the decryption limitation S1 decrypted in the decryption section 114; an encryption section 116 for encrypting the decryption limitation S4 using the time-varying key VK, and outputting the encrypted decryption limitation S3; a contents key generation section 118 for generating the contents key CK from the decryption limitation S4; and a decryption section 120 for decrypting the encrypted contents S5 using the contents key CK, and outputting the contents CT.

The encryption device 101 and the decryption device 102 include the respective common key storage sections 103 and 104 to hold the same common key UK. The same common key UK is stored in the common key storage sections 103 and 104 in advance, or produced in a production process.

The encryption device 101 includes the decryption limitation storage section 111 for storing the decryption limitation S1 and the contents storage section 121 for storing the contents CT. The common key storage section 103, the decryption limitation storage section 111, and the contents storage section 121 are provided in a protect region which is not accessed directly from the outside of the encryption device 101.

Figure 2:
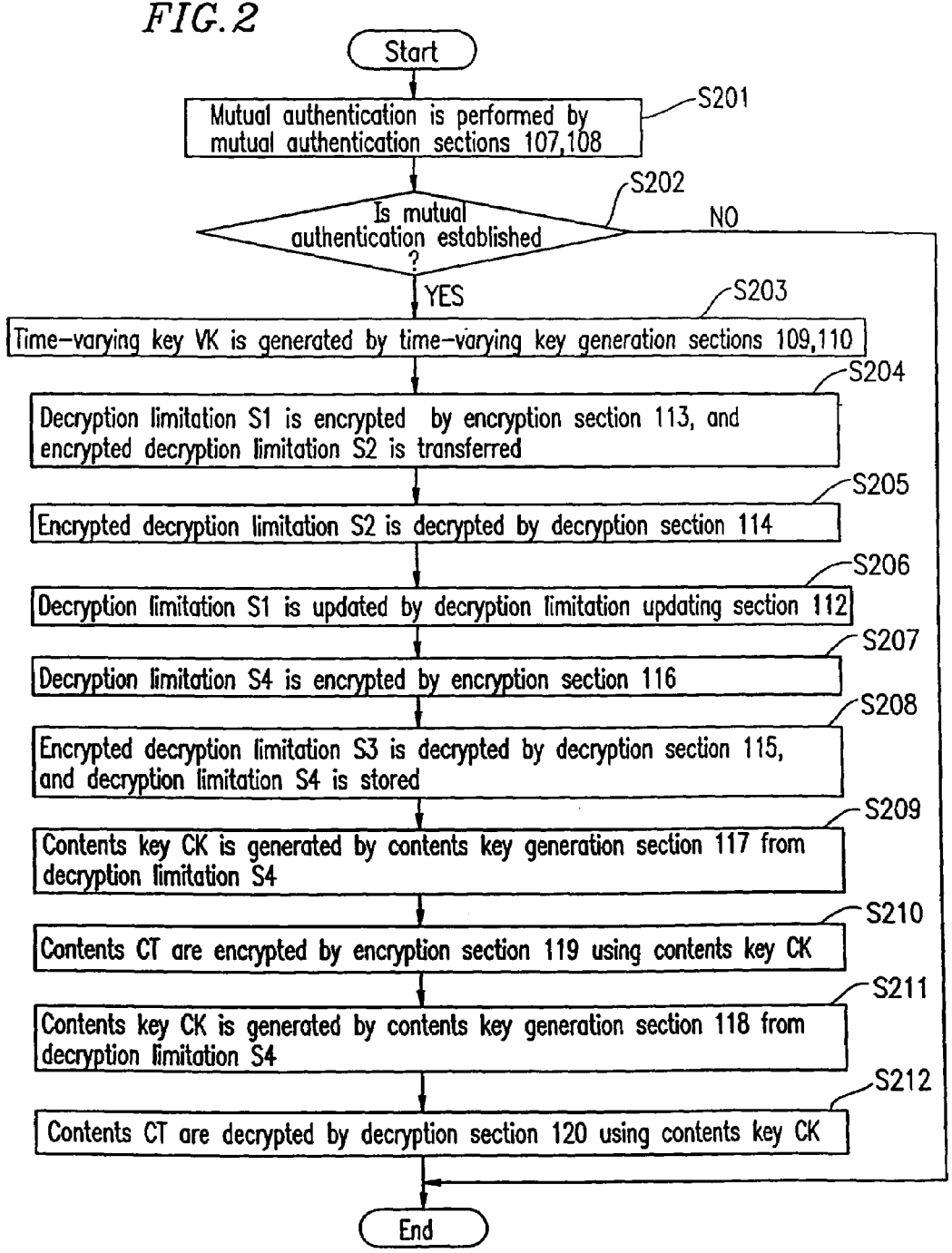
FIG. 2 is a flowchart showing processing steps of the system of Example 1.

FIG. 2 is a flowchart showing processing steps of the system 100 of Example 1. The processing steps of the system 100 including the encryption device 101 and the decryption device 102 are hereinafter described with reference to FIGS. 1 and 2.

The encryption device 101 and the decryption device 102 include the respective random number generation section 105 and 106 which generate the random numbers R1 and R2 which are independent of each other. The random numbers R1 and R2 are exchanged between the encryption device 101 and the decryption device 102. The decryption device 102 generates a response value V1 using the random number R1 and the common key UK. The encryption device 101 generates a response value V2 using the random number R2 and the common key UK. The response values V1 and V2 are exchanged between the encryption device 101 and the decryption device 102. The mutual authentication sections 107 and 108 compares the response value V1 with the response value V2 to determine whether the other device is authentic. In this manner, a challenge-response type mutual authentication is performed (S201).

A determination is made whether the authentication is established in the encryption device 101 and the decryption device 102 (S202). If it is determined that the authentication is not established (NO in S202), the process is ended. If it is determined that the authentication is established (YES in S202), the time-varying key generation sections 109 and 110 generate the same time-varying key VK, which is changed at every mutual authentication, from the respective random numbers R1 and R2 (S203). Thereafter, the decryption limitation S1 stored in the decryption limitation storage section 111 of the encryption device 101 is encrypted in the encryption section 113 using the time-varying key VK, and the encrypted decryption limitation S2 is transferred to the decryption device 102 (S204).

The decryption section 114 decrypts the received decryption limitation S2 using the time-varying key VK (S205). The decryption limitation updating section 112 updates the decryption limitation S1 decrypted in the decryption section 114, in accordance with the decryption limitation updating rule (S206). The encryption section 116 encrypts the updated decryption limitation S4 using the time-varying key VK (S207), and outputs the encrypted decryption limitation S3 to the encryption device 101. The decryption section 115 decrypts the transferred encrypted decryption limitation S3 using the time-varying key VK, and stores the updated decryption limitation S4 in the decryption limitation storage section 111 (S208).

The contents key generation section 117 generates the contents key CK from the decryption limitation S4 (S209). When the contents CT stored in the contents storage section 121 are transferred from the encryption device 101 to the decryption device 102, the encryption section 119 encrypts the contents CT using the contents key CK (S210). The contents key generation section 118 generates the contents key CK from the decryption limitation S4 (S211). The encryption section 120 in the decryption device 102 decrypts the encrypted contents S5 using the contents key CK (S212).

In Example 1, contents are transferred from an encryption device to a decryption device after authentication is established at a single time. Alternatively, mutual authentication may be performed every time the transfer of contents between encryption and decryption devices occurs. In Example 1, the time-varying key VK is generated using the random numbers R1 and R2 which are used in mutual authentication. Alternatively, the time-varying key VK may be generated using the response values V1 and V2.

Different algorithms or the same algorithm may be used to encrypt and decrypt a decryption limitation and contents. An example of an algorithm is DES (Data Encryption Standard).

Different algorithms or the same algorithm may be used to generate a time-varying key and a contents key. An example of an algorithm is a one-way function, such as SHA (Secure Hash Algorithm).

In Example 1, for the sake of simplicity, transmission and reception are performed by the mutual authentication sections 107 and 108, the encryption section 113, the decryption section 114, the decryption section 115, the encryption section 116, the encryption section 119, and the decryption section 120. The transmission and reception are typically managed by control sections 122 and 123. The same applies to examples described later.

As described above, the copyright protection system of Example 1 performs cryptographic communication by associating the copyrighted contents CT with update information on a decryption limitation (the decryption limitation S4).

Therefore, the contents CT cannot be decrypted unless the decryption limitation S1 is updated in an authorized manner.

EXAMPLE 2

Figure 3:
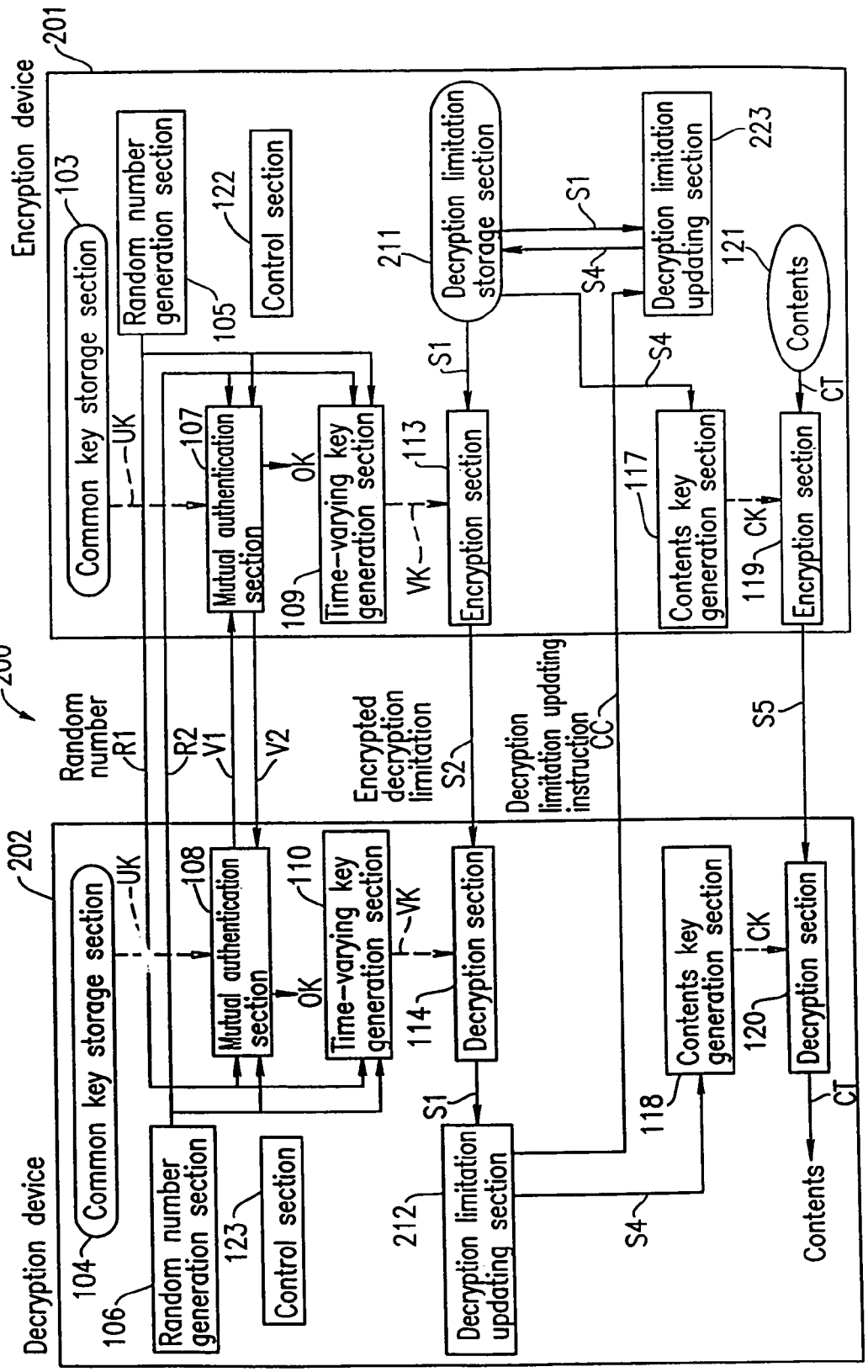
FIG. 3 is a diagram showing a configuration of a system according to Example 2 of the present invention.

FIG. 3 is a diagram showing a copyright protection system 200 according to Example 2 of the present invention. In FIG. 2, the same components as those in FIG. 1 are indicated by the same reference numerals. The description thereof is thus omitted.

In the copyright protection system 100, a decryption limitation S4 updated in a decryption limitation updating section 112 is encrypted/decrypted and then transferred as is in the copyright protection system 100. In the copyright protection system 200, the decryption limitation S4 is not stored in a decryption limitation storage section 111, but a decryption limitation updating section 223 is provided in an encryption device 201.

A decryption limitation updating section 212 in a a decryption device 202 transfers only a decryption limitation updating instruction CC to update a decryption limitation S1 to the decryption limitation updating section 223. The decryption limitation updating section 223 receives the transferred decryption limitation updating instruction CC, updates the decryption limitation S1, and stores the updated decryption limitation S4 in a decryption limitation storage section 211.

As described above, the copyright protection system 200 does not need to transfer the updated decryption limitation S4 associated with generation of the contents key CK from the decryption device 202 to the encryption device 201. Therefore, the secrecy of the decryption limitation S4 is increased. Further, an encryption section and a decryption section (e.g., 116 and 115, respectively, in FIG. 1) which involve transfer of the updated decryption limitation S4 can be deleted, thereby making it possible to reduce the size of the system.

EXAMPLE 3

Figure 4:
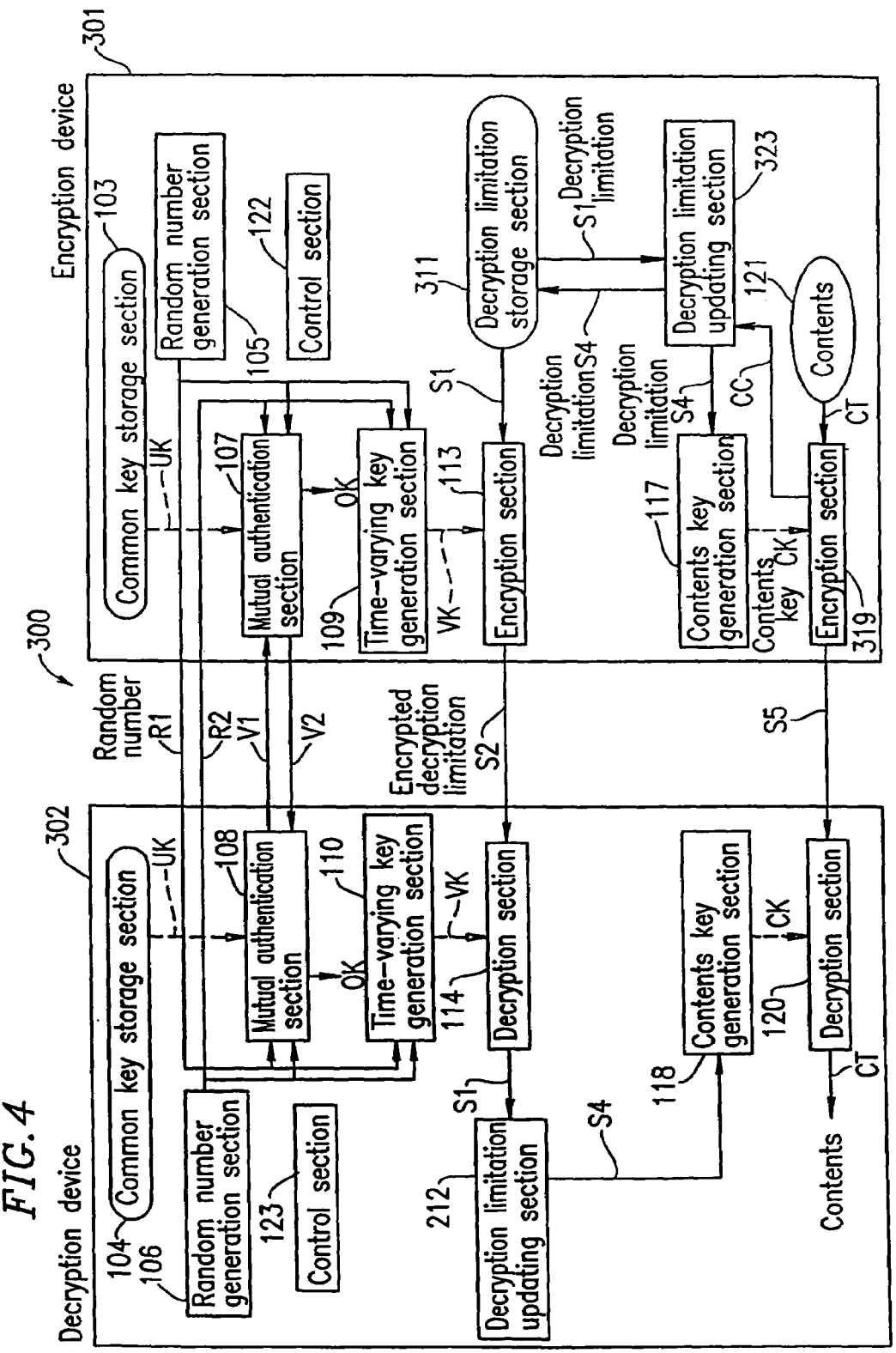
FIG. 4 is a diagram showing a configuration of a system according to Example 3 of the present invention.

FIG. 4 is a diagram showing a copyright protection system 300 according to Example 3 of the present invention. In FIG. 4, the same components as those in FIG. 1 are indicated by the same reference numerals. The description thereof is thus omitted.

In the copyright protection system 200 of FIG. 2, the decryption limitation updating section 223 in the encryption device 201 updates the decryption limitation S1 according to the updating instruction CC from the decryption limitation updating section 212. Unlike the copyright protection system 200, in the copyright protection system 300, the decryption limitation updating section 323 updates a decryption limitation S1 previously stored in a decryption limitation storage section 311 in an encryption device 301. A contents key generation section 117 generates a contents key CK using an updated decryption limitation S4. The decryption limitation updating section 323 stores the updated decryption limitation S4 in a decryption limitation storage a section 311 in response to an encryption section 319 starting encryption of contents CT.

As described above, in the copyright protection system 300 of Example 3, the decryption limitation S1 is not updated according to the instruction from a decryption device 302, but the decryption limitation updating section 323 previously updates the decryption limitation S1 and the contents key generation section 117 generates the contents key CK. Therefore, the processing steps can be reduced.

EXAMPLE 4

Figure 5:
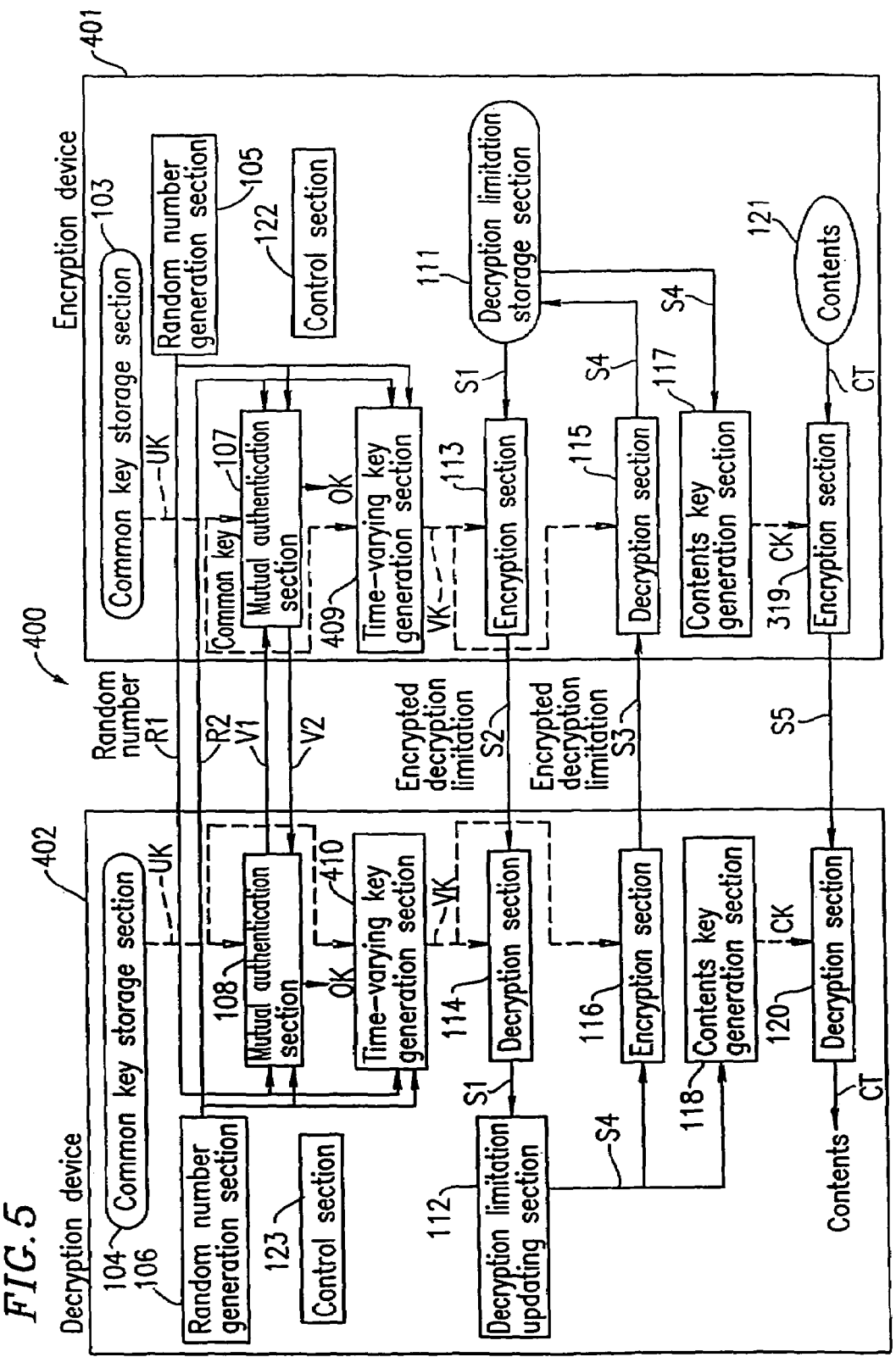
FIG. 5 is a diagram showing a configuration of a system according to Example 4 of the present invention.

FIG. 5 is a diagram showing a copyright protection system 400 according to Example 4 of the present invention. In FIG. 5, the same components as those in FIG. 1 are indicated by the same reference numerals. The description thereof is thus omitted.

In the copyright protection system 400, time-varying key generation sections 409 and 410 generate a time-varying key VK using a common key UK in addition to random numbers R1 and R2. For example, the time-varying key VK is generated by an exclusive OR of the random numbers R1 and R2 and the common key UK, and converting the result using a one-way function.

As described above, according to the copyright protection system 400, the time-varying key VK is generated not only by the random numbers R1 and R2 which can be externally monitored, but in association with the secret common key UK. Therefore, the time-varying key VK is difficult to infer, thereby making it possible to improve the secrecy of the time-varying key VK.

EXAMPLE 5

Figure 6:
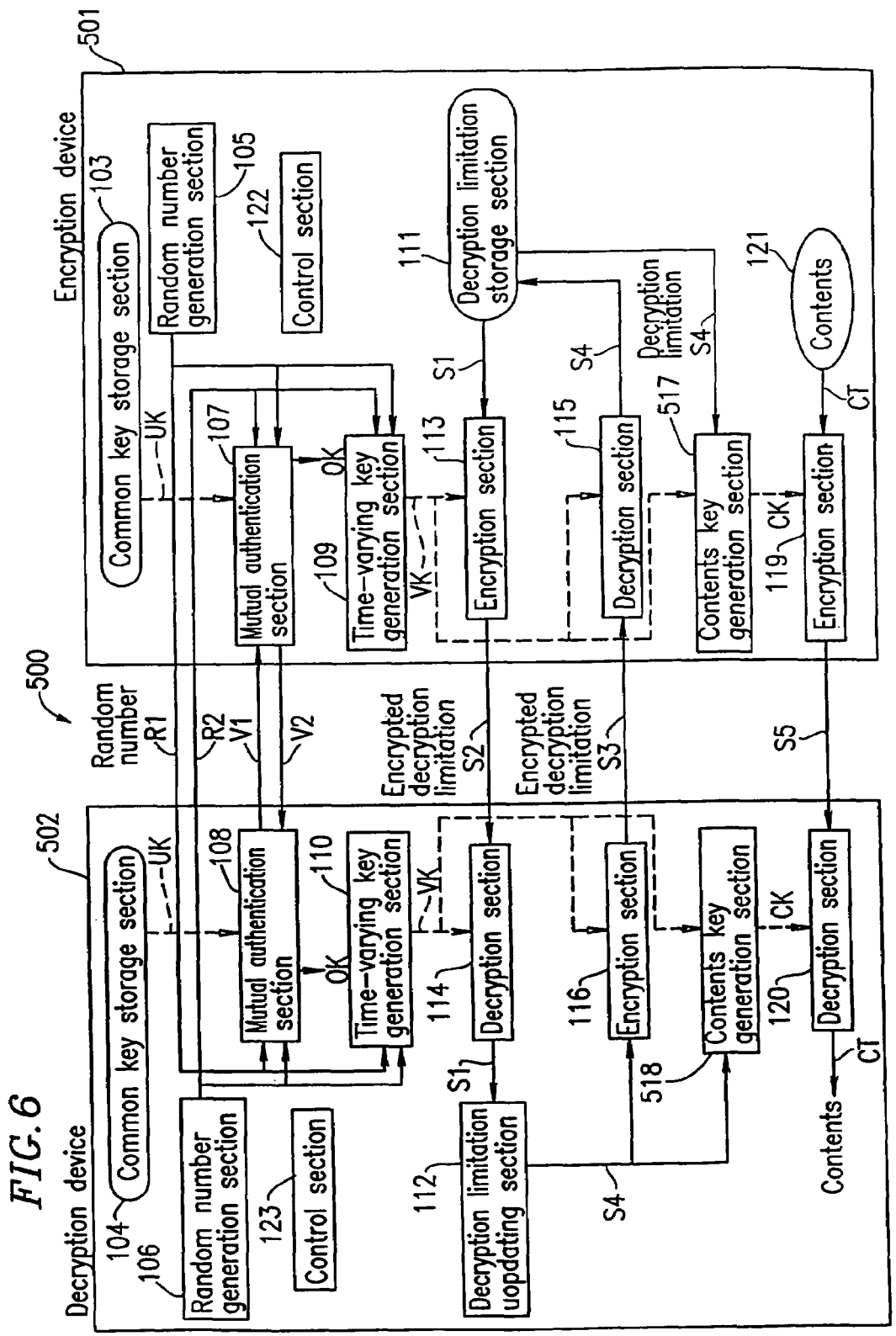
FIG. 6 is a diagram showing a configuration of a system according to Example 5 of the present invention.

FIG. 6 is a diagram showing a copyright protection system 500 according to Example 5 of the present invention. In FIG. 6, the same components as those in FIG. 1 are indicated by the same reference numerals. The description thereof is thus omitted.

In the copyright protection system 500, contents key generation sections 517 and 518 generate a contents key CK using a time-varying key VK in addition to an updated decryption limitation S4. For example, the contents key CK is generated by an exclusive OR of the decryption limitation S4 and the time-varying key VK, and converting the result using a one-way function.

As described above, according to the copyright protection system 500 of Example 5, the contents key CK is generated not only by the updated decryption limitation S4, but in association with the time-varying key VK which time-sequencially varies in each mutual authentication. Therefore, the cryptographic security of contents can be improved.

EXAMPLE 6

Figure 7:
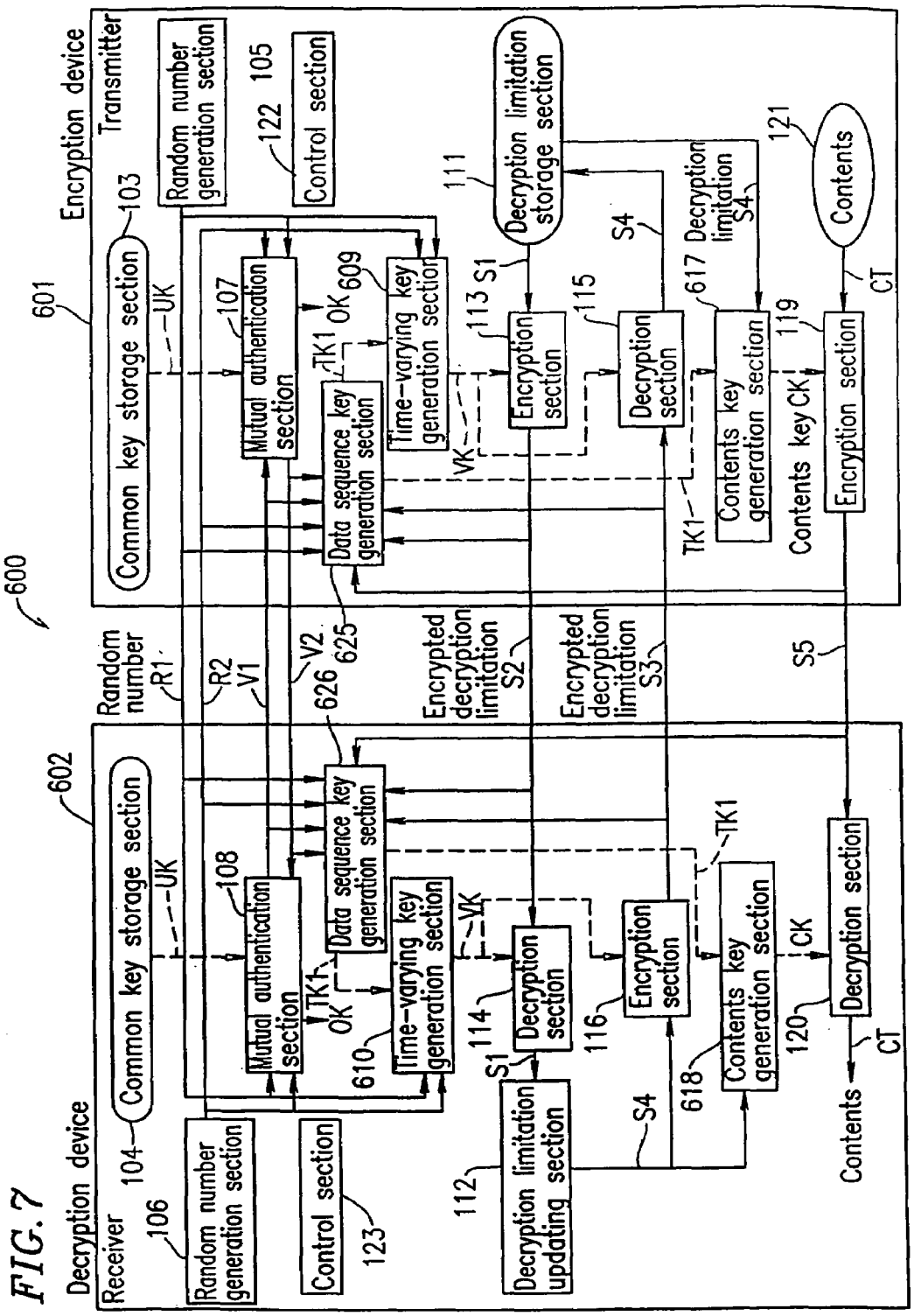
FIG. 7 is a diagram showing a configuration of a system according to Example 6 of the present invention.

FIG. 7 is a diagram showing a copyright protection system 600 according to Example 6 of the present invention. In FIG. 7, the same components as those in FIG. 1 are indicated by the same reference numerals. The description thereof is thus omitted.

In the copyright protection system 600, an encryption device 601 and a decryption device 602 include data sequence key generation sections 625 and 626, respectively, which generate a data sequence key TK1 from all or part of data input to or output from the encryption device 601 and the decryption device 602. In this case, such input or output data include random numbers R1 and R2, response values V1 and V2, encrypted decryption limitations S2 and S3, and encrypted contents S5. The data sequence key TK1 is additionally used to generate a contents key CK in contents key generation sections 617 and 618.

The data sequence key TK1 may be generated by counting a High or Low level of each input/output data, for example. The time-varying key VK may be generated by an exclusive OR of the random numbers R1 and R2 and the data sequence key TK1, and converting the result using a one-way function. All input/output data are not necessarily used to generate the data sequence key TK1. A part of the input/output data may be used.

As described above, in the copyright protection system 600, data input to or output from the encryption device 601 and the decryption device 602 are monitored, and the data sequence key TK1 common to both devices is generated from the input/output data so that the generated data sequence key TK1 is associated with generation of the contents key CK. Therefore, since the same data is input to and output from an encryption device and a decryption device in a cryptographic system, pretending can be prevented.

EXAMPLE 7

Figure 8:
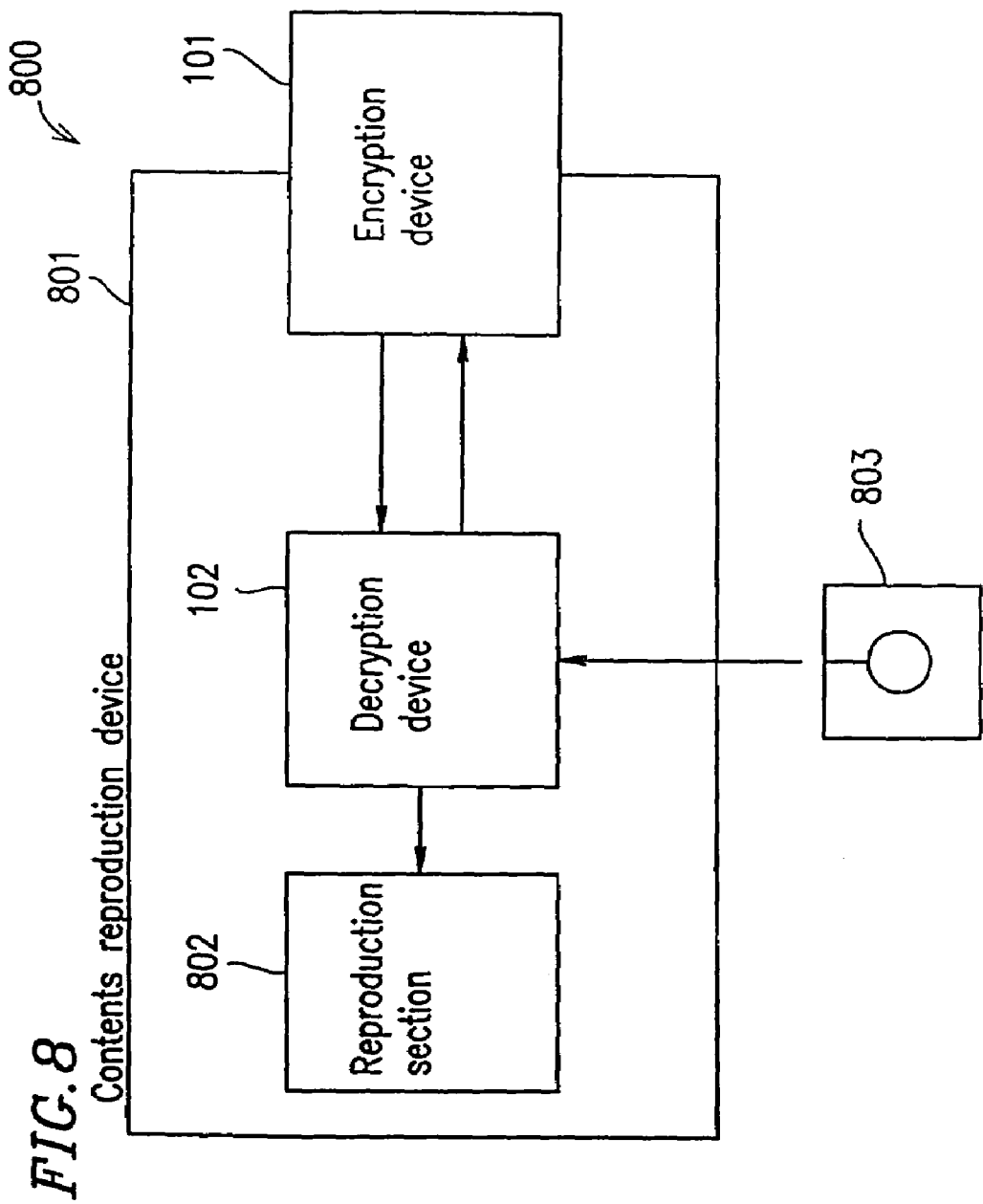
FIG. 8 is a diagram showing a configuration of a system according to Example 7 of the present invention.

FIG. 8 is a diagram showing a configuration of a system 800 in which cryptographic communication is performed between an encryption device 101 and a decryption device 102. Referring to FIG. 8, the encryption device 101 and the decryption device 102 are directly connected to each other. In FIG. 8, the same components as those in FIG. 1 are indicated by the same reference numerals. The description thereof is thus omitted.

The system 800 includes a contents reproduction device 801 for reproducing contents. The the encryption device 101 is attached to the contents reproduction device 801. The contents reproduction device 801 further includes a decryption device 102 described in Example 1 and a reproduction section 802 for reproducing contents decrypted by the decryption device 102.

As described above, the decryption device 102 described in Example 1 may be included in the contents reproduction device 801. The encryption device 101 described in Example 1 is attached to the contents reproduction device 801. The encryption device 101 attached to the contents reproduction device 801 and the decryption device 102 included in the contents reproduction device 801 performs cryptographic communication as described in Example 1.

The contents reproduction device 801 may be a cellular telephone, an audio player, or a personal computer. The encryption device 101 may be a memory card. The encryption device 101 may be any of the encryption devices 201 through 601 described in Examples 2 through 6. The decryption device 102 may be any of the decryption devices 202 through 602 described in Examples 2 through 6.

The decryption device 102 may be operated in accordance with a program for operating the decryption device described in any of Examples 1 through 6, read from a recording medium 803 in which the program is recorded. The recording medium 803 may be a CD-ROM.

Figure 9:
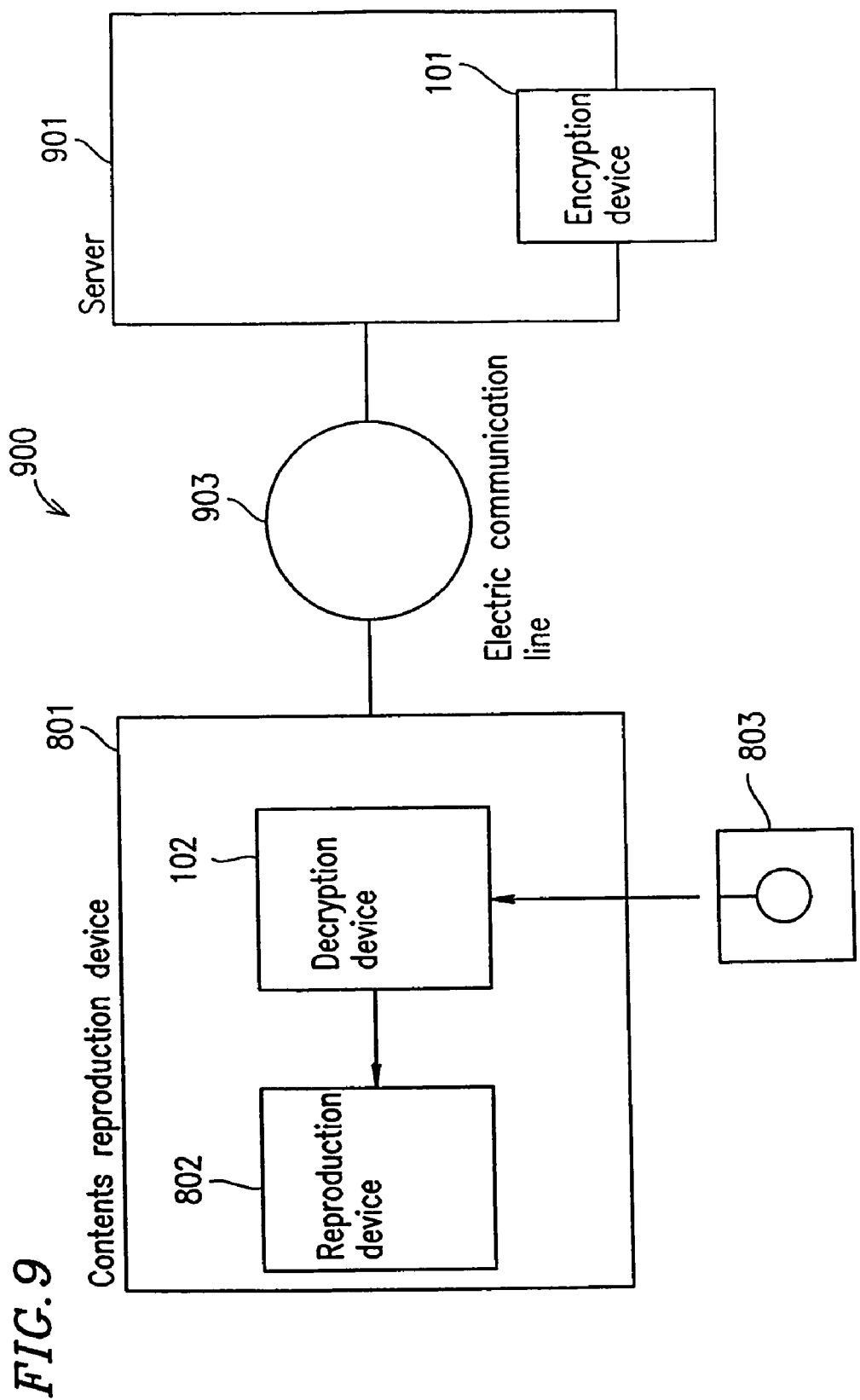
FIG. 9 is a diagram showing another configuration of the system of Example 7.

FIG. 9 is a diagram showing another configuration of the system 800 in which cryptographic communication is performed between the encryption device 101 and the decryption device 102. Referring to FIG. 9, the encryption device 101 and the decryption device 102 are directly connected to each other via an electric communication line. In FIG. 9, the same components as those in FIGS. 1 and 8 are indicated by the same reference numerals. The description thereof is thus omitted.

Referring to FIG. 9, the system 900 includes a contents reproduction device 801 for reproducing contents, and an electric communication line 903 connecting the contents reproduction device 801 and a server 901. The contents reproduction device 801 includes a decryption device 102 described in Example 1 and a reproduction section 802 for reproducing contents decrypted by the decryption device 102. An encryption device 101 described in Example 1 is attached to the server 901.

In this manner, the contents reproduction device 801 for reproducing contents and the server 901 are connected to each other via the electric communication line 903. The encryption device 101 is attached to the server 901. The encryption device 101 attached to the server 901 and the decryption device 102 included in the contents reproduction device 801 perform cryptographic communication via the electric communication line 903.

The electric communication line 903 may be the Internet or a local area network (LAN).

Similar to the example of FIG. 8, the contents reproduction device 801 may be a cellular telephone, an audio player, or a personal computer. The encryption device 101 may be a memory card. The encryption device 101 may be any of the encryption devices 201 through 601 described in Examples 2 through 6. The decryption device 102 may be any of the decryption devices 202 through 602 described in Examples 2 through 6.

Similar to the example of FIG. 8, the decryption device 102 may be operated in accordance with a program for operating the decryption device described in any of Examples 1 through 6, read from a recording medium 803 in which the program is recorded. The recording medium 803 may be a CD-ROM.

In FIG. 9, the encryption device 101 and the decryption device 102 are connected to each other via the electric communication line 903. This invention is not limited to this. The encryption device 101 and the decryption device 102 may be connected to each other via a wireless communication line.

As described above, according to the present invention, a copyright protection system in which a decryption limitation is reliably updated and unauthorized decryption of digital contents is prevented, an encryption device, a decryption device, and a recording medium, can be provided.

Further, according to the present invention, a copyright protection system, an encryption device, a decryption device, and a recording medium can be provided, in which, when update information on a decryption limitation updated by a decryption device is received by a false encryption device pretending to be an authenticated encryption device (instead of the authenticated encryption device), advantageously contents loaded from the authenticated encryption device cannot be decrypted by the decryption device.

Further, according to the present invention, a copyright protection system, an encryption device, a decryption device, and a recording medium can be provided, in which cryptographic communication is performed by associating copyrighted contents with update information on a decryption limitation and, therefore, advantageously the contents cannot be decrypted unless the decryption limitation is updated in an authorized manner.

Further, according to the present invention, a copyright protection system, an encryption device, a decryption device, and a recording medium can be provided, in which updated decryption limitation associated with generation of a contents key does not need to be transferred from a decryption device to an encryption device and therefore, advantageously the secrecy of the decryption limitation is increased, and further, an encryption section and a decryption section which involve transfer of the updated decryption limitation can be deleted, thereby advantageously making it possible to reduce the size of the system.

Further, according to the present invention, a copyright protection system, an encryption device, a decryption device, and a recording medium can be provided, in which a decryption limitation is not updated according to an instruction from a decryption device, but rather a decryption limitation updating section previously updates the decryption limitation and a contents key generation section generates the contents key and, therefore, advantageously the processing steps can be reduced.

Further, according to the present invention, a copyright protection system, an encryption device, a decryption device, and a recording medium can be provided, in which a time-varying key is generated not only by random numbers which can be externally monitored, but also in association with a secret common key and, therefore, the time-varying key is difficult to infer, thereby advantageously making it possible to improve the secrecy of the time-varying key.

Further, according to the present invention, a copyright protection system, an encryption device, a decryption device, and a recording medium can be provided, in which data input to or output from an encryption device and a decryption device are monitored, and a data sequence key common to both devices is generated from the input/output data so that the generated data sequence key is associated with generation of a contents key and, therefore, pretending can be advantageously prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A copyright protection system comprising:
an encryption device and a decryption device, wherein cryptographic communication is performed between the encryption device and the decryption device using a contents encryption key and a contents decryption key,
wherein the encryption device includes
a contents storage section for storing contents,
a first contents key generation section for generating the contents encryption key based on a second decryption limitation obtained by updating a first decryption limitation, and
a first encryption section for encrypting the contents using the contents encryption key and outputting the encrypted contents, and
wherein the decryption device includes
a second contents key generation section for generating the contents decryption key from the second decryption limitation, the second decryption limitation obtained by updating the first decryption limitation in the decryption device, and
a first decryption section for decrypting the encrypted contents transferred from the encryption device using the contents decryption key generated by the second contents key generation section, and
wherein the encryption device further includes a third encryption section for encrypting the first decryption limitation using a time-varying key and outputting a second encrypted decryption limitation to the decryption device, and the decryption device further includes a third decryption section for decrypting the second encrypted decryption limitation transferred from the third encryption section using the time-varying key and outputting the first decryption limitation, and
wherein the decryption device further includes a first decryption limitation updating section for updating the first decryption limitation to the second decryption limitation in accordance with a decryption limitation updating rule, and a second encryption section for encrypting the second decryption limitation using a time-varying key, and outputting the first encrypted decryption limitation, and the encryption device further includes a second decryption section for decrypting the first encrypted decryption limitation transferred from the second encryption section using the time-varying key to generate the second decryption limitation, wherein the time-varying key is not required to be transmitted to the decryption device; and wherein the first contents key generation section generates the contents encryption key based on the second decryption limitation generated by the second decryption section.

2. A copyright protection system according to claim 1, wherein the encryption device further includes a first common key storage section for storing a common key, a decryption limitation storage section for storing the first decryption limitation, a first random number generation section for generating a first random number, a first mutual authentication section for performing mutual authentication in association with the decryption device using the first random number, and a second random number transferred from the decryption device, and a first time-varying key generation section for generating the time-varying key using the first random number and the second random number in response to the authentication by the first mutual authentication section, and wherein the decryption device further includes a second common key storage section for storing the common key, a second random number generation section for generating the second random number, a second mutual authentication section for performing mutual authentication in association with the encryption device using the second random number and the first random number, and a second time-varying key generation section for generating the time-varying key using the second random number and the first random number in response to the authentication by the second mutual authentication section.

3. A copyright protection system according to claim 1, wherein the encryption device further includes a second decryption limitation updating section for updating the first decryption limitation to the second decryption limitation in accordance with the decryption limitation updating rule in response to the updating of the first decryption limitation by the first decryption limitation updating section, the first contents key generation section generates the contents encryption key based on the second decryption limitation updated by the first decryption limitation updating section.

4. A copyright protection system according to claim 3, wherein the encryption device further includes a first common key storage section for storing a common key, a decryption limitation storage section for storing the first decryption limitation, a first random number generation section for generating a first random number, a first mutual authentication section for performing mutual authentication in association with the decryption device using the first random number, and a second random number transferred from the decryption device, and a first time-varying key generation section for generating a time-varying key using the first random number and the second random number in response to the authentication by the first mutual authentication section, wherein the time-varying key is not required to be transmitted to the decryption device, and wherein the decryption device further includes a second common key storage section for storing the common key, a second random number generation section for generating the second random number, a second mutual authentication section for performing mutual authentication in association with the encryption device using the second random number and the first random number, and a second time-varying key generation section for generating the time-varying key using the second random number and the first random number in response to the authentication by the second mutual authentication section.

5. A copyright protection system according to claim 4, wherein the second decryption limitation updating section updates the first decryption limitation to the second decryption limitation in advance, the first contents key generation section generates the contents key from the second decryption limitation, and the second decryption limitation updating section stores the second decryption limitation in the decryption limitation storage section in response to the start of processing by the first encryption section.

6. A copyright protection system according to claim 2, wherein the first and second time-varying key generation sections generate the time-varying key based on the first and second random numbers and the common key.

7. A copyright protection system according to claim 2, wherein the first and second contents key generation sections generate the contents encryption key and the contents decryption key based on the second decryption limitation and the time-varying key.

8. A copyright protection system according to claim 2, wherein the encryption device and the decryption device further include respective first and second data sequence key generation sections for generating a data sequence key based on a data sequence input to or output from the encryption device and the decryption device, and wherein the first and second time-varying key generation sections generate the time-varying key based on the first and second random numbers and the respective data sequence key.

9. A copyright protection system according to claim 2, wherein the encryption device and the decryption device further include respective first and second data sequence key generation sections for generating a data sequence key based on a data sequence input to or output from the encryption device and the decryption device, and wherein the first and second time-varying key generation sections generate the time-varying key based on the first and second random numbers, the common key, and the respective data sequence key.

10. A copyright protection system according to claim 2, wherein the encryption device and the decryption device further include respective first and second data sequence key generation sections for generating a data sequence key based on a data sequence input to or output from the encryption device and the decryption device, and wherein the first and second contents key generation sections generate the respective contents encryption key and contents decryption key based on the second decryption limitation and the respective data sequence key.

11. A copyright protection system according to claim 2, wherein the encryption device and the decryption device further include respective first and second data sequence key generation sections for generating a data sequence key based on a data sequence input to or output from the encryption device and the decryption device, and wherein the first and second contents key generation section generate the respective contents encryption key and contents decryption key based on the second decryption limitation, the time-varying key, and the respective data sequence key.

12. A copyright protection system according to claim 2, wherein the first and second mutual authentication sections mutually authenticate the decryption device and the encryption device, respectively, by communication in accordance with a challenge-response type authentication protocol.

13. An encryption device for performing cryptographic communication in association with a decryption device using a contents encryption key, comprising:
a contents storage section for storing contents:
a first contents key generation section for generating the contents encryption key based on a second decryption limitation obtained by updating a first decryption limitation;
a first encryption section for encrypting the contents using the contents encryption key and outputting the encrypted contents; and
a third encryption section for encrypting the first decryption limitation using a time-varying key and outputting a second encrypted decryption limitation to the decryption device;
a second decryption section for decrypting the first encrypted decryption limitation transferred from the second encryption section using the time-varying key to generate the second decryption limitation,
wherein cryptographic communication is performed between the encryption device and the decryption device using the contents encryption key and a contents decryption key,
wherein the decryption device includes
a second contents key generation section for generating the contents decryption key from the second decryption limitation, the second decryption limitation obtained by updating the first decryption limitation in the decryption device;
a first decryption section for decrypting the encrypted contents transferred from the encryption device using the contents decryption key generated by the second contents key generation section;
a third decryption section for decrypting the second encrypted decryption limitation transferred from the third encryption section using the time-varying key and outputting the first decryption limitation;
a first decryption limitation updating section for updating the first decryption limitation to the second decryption limitation in accordance with a decryption limitation updating rule, and
a second encryption section for encrypting the second decryption limitation using a time-varying key, and outputting the first encrypted decryption limitation, and wherein the time-varying key is not required to be transmitted to the decryption device; and wherein the first contents key generation section generates the contents encryption key based on the second decryption limitation generated by the second decryption section.

14. An encryption device according to claim 13, further including
a common key storage section for storing a common key,
a decryption limitation storage section for storing the first decryption limitation,
a first random number generation section for generating a first random number,
a mutual authentication section for performing mutual authentication in association with the decryption device using the first random number, and a second random number transferred from the decryption device, and
a time-varying key generation section for generating the time-varying key using the first random number and the second random number in response to the authentication by the mutual authentication section.

15. An encryption device according to claim 13, further including a decryption limitation updating section for updating the first decryption limitation to the second decryption limitation in accordance with a decryption limitation updating rule in response to the updating of a decryption limitation by the decryption device,
wherein the contents key generation section generates the contents encryption key based on the second decryption limitation obtained by the decryption limitation updating section.

16. An encryption device according to claim 15, further including
a common key storage section for storing a common key,
a decryption limitation storage section for storing the first decryption limitation,
a first random number generation section for generating a first random number,
a mutual authentication section for performing mutual authentication in association with the decryption device using the first random number, and a second random number transferred from the decryption device, and
a time-varying key generation section for generating the time-varying key using the first random number and the second random number in response to the authentication by the mutual authentication section.

17. An encryption device according to claim 15, wherein:
the decryption limitation updating section updates the first decryption limitation to the second decryption limitation in advance;
the decryption limitation updating section outputs the second decryption limitation to the contents key generation section;
the contents key generation section generates the contents encryption key from the second decryption limitation; and
the decryption limitation updating section stores the second decryption limitation in the decryption limitation storage section in response to the start of processing by the first encryption section.

18. An encryption device according to claim 14, wherein the time-varying key generation section generates the time-varying key based on the first and second random numbers and the common key.

19. An encryption device according to claim 14, wherein the contents key generation section generates the contents encryption key based on the second decryption limitation and the time-varying key.

20. An encryption device according to claim 14, further including a data sequence key generation section for generating a data sequence key based on a data sequence input to or output from the encryption device, the time-varying key generation section generates the time-varying key based on the first and second random numbers and the data sequence key.

21. An encryption device according to claim 14, further including a data sequence key generation section for generating a data sequence key based on a data sequence input to or output from the encryption device,
  wherein the time-varying key generation section generates the time-varying key based on the first and second random numbers, the common key, and the data sequence key.

22. An encryption device according to claim 14, further including a data sequence key generation section for generating a data sequence key based on a data sequence input to or output from the encryption device,
  wherein the contents key generation section generates the contents encryption key based on the second decryption limitation and the data sequence key.

23. An encryption device according to claim 14, further including a data sequence key generation section for generating a data sequence key based on a data sequence input to or output from the encryption device,
  wherein the contents key generation section generates the contents encryption key based on the second decryption limitation, the time-varying key, and the data sequence key.

24. A decryption device for performing cryptographic communication in association with an encryption device using a contents decryption key, comprising:
  a second contents key generation section for generation the contents decryption key from a second decryption limitation, the second decryption limitation obtained by updating a first decryption limitation in the decryption device;
  a first decryption section for decrypting an encrypted contents transferred from the encryption device using the contents decryption key generated by the second contents key generation section;
  a first decryption limitation updating section for updating the first decryption limitation to the second decryption limitation in accordance with a decryption limitation updating rule;
  a second encryption section for encrypting the second decryption limitation using a time-varying key, and outputting a first encrypted decryption limitation; and,
  a third decryption section for decrypting a second encrypted decryption limitation transferred from a third encryption section using the time-varying key and outputting the first decryption limitation;
  wherein cryptographic communication is performed between the encryption device and the decryption device using a contents encryption key and the contents decryption key,
  wherein the encryption device includes:
  a contents storage section for storing contents,
  a first contents key generation section for generation the contents encryption key based on the second decryption limitation obtained by updating the first decryption limitation, and
  a first encryption section for encrypting the contents using the contents encryption key and outputting the encrypted contents, and
  the third encryption section for encrypting the first decryption limitation using a time-varying key and outputting the second encrypted decryption limitation to the decryption device;
  a second decryption section for decrypting the first encrypted decryption limitation transferred from the second encryption section using the time-varying key to generate the second decryption limitation,
  wherein the time-varying key is not required to be transmitted to the decryption device; and
  wherein the first contents key generation section generates the contents encryption key based on the second decryption limitation generated by the second decryption section.

25. A decryption device according to claim 24, further including
  a common key storage section for storing a common key,
  a random number generation section for generating a second random number,
  a mutual authentication section for performing mutual authentication in association with the encryption device using the second random number and a first random number, and
  a time-varying key generation section for generating the time-varying key using the second random number and the first random number in response to the authentication by the mutual authentication section.

26. A decryption device according to claim 25, wherein the time-varying key generation section generates the time-varying key based on the first and second random numbers and the common key.

27. A decryption device according to claim 25, wherein the contents key generation section generates the contents decryption key based on the second decryption limitation and the time-varying key.

28. A decryption device according to claim 25, further including a data sequence key generation section for generating a data sequence key based on a data sequence input to or output from the decryption device,
  wherein the time-varying key generation section generates the time-varying key based on the first and second random numbers and the data sequence key.

29. A decryption device according to claim 25, further including a data sequence key generation section for generating a data sequence key based on a data sequence input to or output from the decryption device,
  wherein the time-varying key generation section generates the time-varying key based on the first and second random numbers, the common key, and the data sequence key.

30. A decryption device according to claim 25, further including a data sequence key generation section for generating a data sequence key based on a data sequence input to or output from the decryption device,
  wherein the contents key generation section generates the contents decryption key based on the second decryption limitation and the data sequence key.

31. A decryption device according to claim 25, further including a data sequence key generation section for generating a data sequence key based on a data sequence input to or output from the decryption device, wherein the contents key generation section generates the contents decryption key based on the second decryption limitation, the time-varying key, and the data sequence key.

32. A recording medium storing a program for use in causing a computer to perform cryptographic communication, wherein:
the program causes the computer to function as:
an encryption device and a decryption device, wherein cryptographic communication is performed between the encryption device and the decryption device using a contents encryption key and a contents decryption key,
wherein the encryption device includes
a contents storage section for storing contents,
a first contents key generation section for generation the contents encryption key based on a second decryption limitation obtained by updating a first decryption limitation, and
a first encryption section for encrypting the contents using the contents encryption key and outputting the encrypted contents, and
wherein the decryption device includes
a second contents key generation section for generation the contents decryption key from the second decryption limitation, the second decryption limitation obtained by updating the first decryption limitation in the decryption device, and
a first decryption section for decrypting the encrypted contents transferred from the encryption device using the contents decryption key generated by the second contents key generation section, and
wherein the encryption device further includes a third encryption section for encrypting the first decryption limitation using a time-varying key and outputting a second encrypted decryption limitation to the decryption device, and the decryption device further includes a third decryption section for decrypting the second encrypted decryption limitation transferred from the third encryption section using the time-varying key and outputting the first decryption limitation, and
wherein the decryption device further includes a first decryption limitation updating section for updating the first decryption limitation to the second decryption limitation in accordance with a decryption limitation updating rule, and
a second encryption section for encrypting the second decryption limitation using a time-varying key, and outputting the first encrypted decryption limitation, and
the encryption device further includes a second decryption section for decrypting the first encrypted decryption limitation transferred from the second encryption section using the time-varying key to generate the second decryption limitation,
wherein the time-varying key is not required to be transmitted to the decryption device; and
wherein the first contents key generation section generates the contents encryption key based on the second decryption limitation generated by the second decryption section.

33. A recording medium according to claim 32, wherein the program causes the computer to further function as:
a common key storage section for storing a common key;
a random number generation section for generating a second random number;
a mutual authentication section for performing mutual authentication in association with the encryption device using the second random number and a first random number; and
a time-varying key generation section for generating the time-varying key using the second random number and the first random number in response to the authentication by the mutual authentication section.

34. A recording medium according to claim 33, wherein the time-varying key generation section generates the time-varying key based on the first and second random numbers and the common key.

35. A recording medium according to claim 33, wherein the contents key generation section generates the contents decryption key based on the second decryption limitation and the time-varying key.

36. A recording medium according to claim 33, wherein:
the program causes the computer to further function as a data sequence key generation section for generating a data sequence key based on a data sequence input to or output from a decryption device; and
the time-varying key generation section generates the time-varying key based on the first and second random numbers and the data sequence key.

37. A recording medium according to claim 33, wherein:
the program causes the computer to further function as a sequence key generation section for generating a data sequence key based on a data sequence input to or output from a decryption device; and
the time-varying key generation section generates the time-varying key based on the first and second random numbers, the common key, and the data sequence key.

38. A recording medium according to claim 33, wherein:
the program causes the computer to further function as a data sequence key generation section for generating a data sequence key based on a data sequence input to or output from a decryption device; and
the contents key generation section generates the contents decryption key based on the second decryption limitation and the data sequence key.

39. A recording medium according to claim 33, wherein:
the program causes the computer to further function as a data sequence key generation section for generating a data sequence key based on a data sequence input to or output from a decryption device; and
the contents key generation section generates the contents decryption key based on the second decryption limitation, the time-varying key, and the data sequence key.

40. A copyright protection system according to claim 1, wherein the first and second contents key generation sections generate the contents encryption key and the contents decryption key by using an algorithm which uses the second decryption limitation as an input.

41. A copyright protection system according to claim 40, wherein the algorithm is a one-way function.

42. A copyright protection system according to claim 1, wherein neither the contents encryption key nor the contents decryption key is required to be transmitted between the encryption device and the decryption device, and wherein the time-varying key is not required to be transmitted between the encryption device and the decryption device.

* * * * *

UNITED STATES PATENT AND TRADEMARK OFFICE
CERTIFICATE OF CORRECTION

PATENT NO.         : 7,617,402 B2
APPLICATION NO. : 09/828559
DATED              : November 10, 2009
INVENTOR(S)        : Shibata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1646 days.

Signed and Sealed this

Nineteenth Day of October, 2010

David J. Kappos
*Director of the United States Patent and Trademark Office*